US012761851B2

(12) United States Patent
Lin et al.

(10) Patent No.: US 12,761,851 B2
(45) Date of Patent: Oct. 13, 2026

(54) COLOR PROFILE UPDATES FOR COMPUTING DEVICES

(71) Applicant: Hewlett-Packard Development Company, L.P., Spring, TX (US)

(72) Inventors: Yi Fan Lin, Taipei City (TW); Kai-Chieh Chang, Taipei City (CN); Li-Pang Liang, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 207 days.

(21) Appl. No.: 18/689,841

(22) PCT Filed: Sep. 16, 2021

(86) PCT No.: PCT/US2021/050731
§ 371 (c)(1),
(2) Date: Mar. 6, 2024

(87) PCT Pub. No.: WO2023/043447
PCT Pub. Date: Mar. 23, 2023

(65) Prior Publication Data
US 2024/0385796 A1 Nov. 21, 2024

(51) Int. Cl.
*G06F 3/14* (2006.01)

(52) U.S. Cl.
CPC .................................. *G06F 3/1423* (2013.01)

(58) Field of Classification Search
None
See application file for complete search history.

(56) References Cited

U.S. PATENT DOCUMENTS

2003/0091229 A1* 5/2003 Edge ........................ H04N 9/69 348/E9.054
2005/0099431 A1* 5/2005 Herbert .................... G09G 5/00 345/601
2006/0195369 A1* 8/2006 Webb ................ G06Q 30/0603 705/26.81
2011/0249015 A1* 10/2011 Lonkar .................... G09G 5/02 345/589
2013/0120656 A1 5/2013 Wilson et al.
2014/0232614 A1 8/2014 Kunkel
2017/0131963 A1 5/2017 Stahl et al.

* cited by examiner

*Primary Examiner* — Yingchun He
(74) *Attorney, Agent, or Firm* — Quarles & Brady LLP

(57) ABSTRACT

In some examples, a computing device includes a first video interface for a first monitor, a second video interface for a second monitor, and a processor. In some examples, the processor obtains a first monitor identification from the first monitor and obtains a second monitor identification from the second monitor. In some examples, the processor sends the first monitor identification and the second monitor identification to a color profile server. In some examples, the processor receives a first color profile and a second color profile from the color profile server. In some examples, the processor causes the first color profile and the second color profile to install on the computing device.

20 Claims, 6 Drawing Sheets

COLOR PROFILE UPDATES FOR COMPUTING DEVICES

BACKGROUND

Some electronic devices include electronic circuitry for performing processing. As processing capabilities have expanded, electronic devices have been utilized to perform more functions. For example, a variety of electronic devices are used for work, communication, and entertainment. Electronic devices may be linked to other devices and may communicate with other devices.

DETAILED DESCRIPTION

Figure 1:
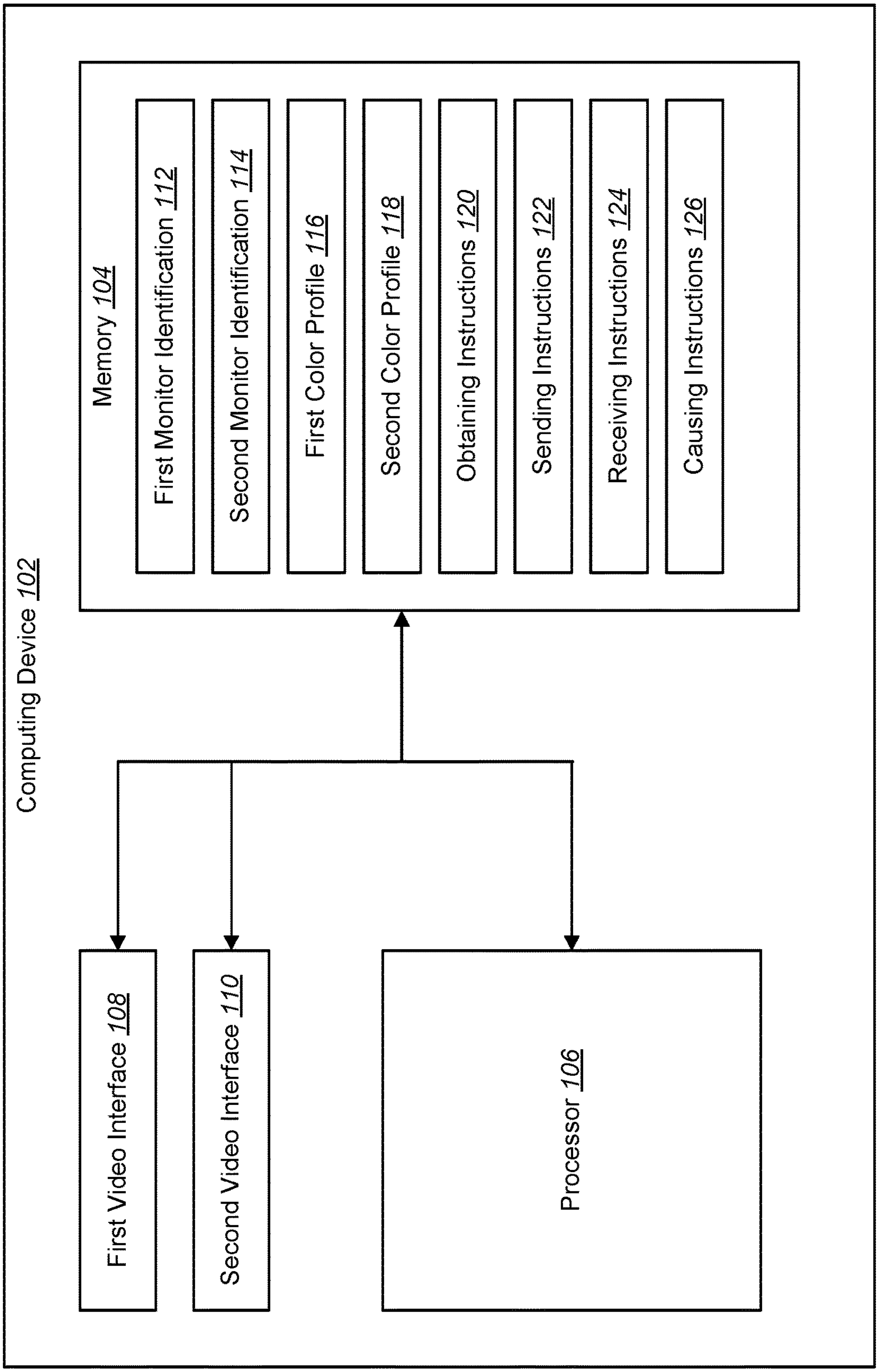
FIG. 1 is a block diagram illustrating an example of a computing device that may provide color profile updates.

Different computer monitors or display devices may not have a consistent color. For example, different display devices may not have matching color spaces rather than fluctuating color spaces. When a user has two monitors side-by-side, one monitor may appear to be more red, and the other monitor may appear to be more green. Depending on the manufacturer of the hardware involved, one monitor may appear to be more blue than another monitor. When the colors of computer monitors being used are not consistent, it may cause a poor user experience.

In some examples, when a computing device is running the Microsoft® Windows® operating system, a user may use the Color Management tool found in the Control Panel to manually adjust color profiles for computer monitors. A color profile is a set of data that characterizes a color input or output device. Generally speaking, a profile provides a mapping between the device source and a profile connection space and may define the color gamut that will be displayed by the device (or types of devices corresponding to the device classification).

A user may access the Color Management tool to try to fix color mismatches between monitors. Different color profiles may be installed or applied for a monitor to change how the monitor displays color. In one example, a color profile may be an International Color Consortium (ICC) profile. The user may view the monitors and manually change ICC profiles on the computing device until the user is satisfied with the color matching of the monitors.

As explained more fully below, techniques are described herein that provide a computing device that updates color profiles for a multiple monitor configuration to provide a more automated color match between the multiple monitors. The computing device obtains monitor identifications for the monitors and sends the identifications to a color profile server via a computer network. The server on the computer network receives the identifications and determines the new set of calibrated profiles for the monitors based on the specific monitor combination and sends the new set of profiles back to the computing device. The computing device then receives the new set of profiles from the server and installs them on the computing device.

Throughout the drawings, similar reference numbers may designate similar or identical elements. When an element is referred to without a reference number, this may refer to the element generally, with and/or without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a block diagram of an example of a computing device 102 that may provide color profile updates. The computing device 102 includes a processor 106, which may also be referred to as a processing resource. The processor 106 executes instructions stored in the memory 104.

A computing device 102 is an electronic device that includes electronic circuitry (e.g., integrated circuitry, a chip(s), etc.). Examples of electronic devices may include computers, smartphones, tablet devices, game consoles, etc. Some examples of electronic devices may utilize circuitry (e.g., controller(s) and/or processor(s), etc.) to perform an operation or operations. In some examples, electronic devices may execute instructions stored in memory 104 to perform the operation(s). Instructions may be code and/or programming that specifies functionality or operation of the circuitry. In some examples, instructions may be stored in memory 104 (e.g., Read-Only Memory (ROM), Erasable Programmable Read-Only Memory (EPROM), Electrically Erasable Programmable Read-Only Memory (EEPROM), flash memory, dynamic random-access memory (DRAM), synchronous DRAM (SDRAM), magnetoresistive random-access memory (MRAM), phase-change random-access memory (PCRAM), hard disk drive (HDD), solid state drive (SSD), optical drive, etc.). In some examples, different circuitries in an electronic device may store and/or utilize separate instructions for operation.

The processor 106 may be any of a central processing unit (CPU), a digital signal processor (DSP), a semiconductor-based microprocessor, graphics processing unit (GPU), field-programmable gate array (FPGA), an application-specific integrated circuit (ASIC), and/or other hardware device suitable for retrieval and execution of instructions stored in the memory 104. The processor 106 may fetch, decode, and/or execute instructions stored in the memory 104. In some examples, the processor 106 may include an electronic circuit or circuits that include electronic components for performing a function or functions of the instructions. In some examples, the processor 106 may perform one, some, or all of the operations, aspects, etc., described in connection with one, some, or all of FIGS. 1-6. For example, the memory 104 may store instructions for one, some, or all of the operations, aspects, etc., described in relation to one, some, or all of FIGS. 1-6.

The memory 104 may be any electronic, magnetic, optical, or other physical storage device that contains or stores electronic information (e.g., instructions and/or data). The memory 104 may be, for example, Random-Access Memory (RAM), EEPROM, a storage device, an optical disc, and/or the like. In some examples, the memory 104 may be volatile and/or non-volatile memory, such as DRAM, EEPROM, MRAM, PCRAM, memristor, flash memory, and/or the like. In some implementations, the memory 104 may be a non-transitory tangible machine-readable storage medium, where the term "non-transitory" does not encompass transitory propagating signals. In some examples, the memory 104 may include multiple devices (e.g., a RAM card and a solid-state drive (SSD)). In some examples, the memory 104 of the computing device 102 may store instructions as shown.

The computing device 102 includes a first video interface 108 for connecting to a first monitor and a second video interface 110 for connecting to a second monitor. The processor 106 may be in electronic communication with the first video interface 108 and the second video interface 110. A computing device 102 may include additional components (not shown) and/or some of the components described herein may be removed and/or modified without departing from the scope of this disclosure.

In some examples, a video interface may be a video port, a video card, or any other communications port or link on the computing device 102 capable of interfacing with a computer monitor. For example, a computing device may be linked to another computing device or devices using a wired link. More specifically, a computing device may include a wired communication interface (e.g., connector or connectors) for connecting electronic devices such as display devices, monitors, televisions, etc. Connectors are structures that enable forming a physical and/or electrical connection. For instance, a connector may be a port, plug, and/or electrical interface, etc. A connector or connectors may allow electronic devices to be connected with a cable or cables. Examples of connectors include DisplayPort™ (DP) connectors, High-Definition Multimedia Interface (HDMI®) connectors, Universal Serial Bus (USB) connectors, Lightning® connectors, Digital Visual Interface (DVI) connectors, OCuLink connectors, Ethernet connectors, etc.

In some examples, a computing device 102 may be linked to another electronic device (such as a monitor or display device) with a wireless link. For instance, a computing device may include a wireless communication interface to send and/or receive wireless (e.g., radio frequency (RF)) signals. Examples of wireless communication interfaces may include an Institute of Electrical and Electronics Engineers (IEEE) 802.11 (Wi-Fi) interfaces, Bluetooth interfaces, cellular (e.g., 3G, Long-Term Evolution (LTE), 4G, 5G, etc.) interfaces, etc.

A link between electronic devices may be a direct link (e.g., without an intervening device) or an indirect link (e.g., with an intervening device or devices). For instance, a link may be established between electronic devices over a network using a hub(s), repeater(s), splitter(s), router(s), and/or switch(es), etc.

The memory 104 may store a first monitor identification 112 that identifies the first monitor and a second monitor identification 114 that identifies the second monitor. The memory 104 may also store a first color profile 116 to be used with the first monitor and a second color profile 118 to be used with the second monitor. The first color profile 116 and the second color profile 118 are the color profiles received by the color database.

The memory 104 may store instructions to be executed by the processor 106. Obtaining instructions 120 cause, when executed by a processor 106, the obtaining of a monitor identification from a monitor. Sending instructions 122 cause, when executed by a processor 106, sending monitor identifications to a color profile server. Receiving instructions 124 cause, when executed by a processor 106, receiving color profiles from the color profile server. Causing instructions 126 cause, when executed by a processor 106, the installation of the color profiles on the computing device 102. Instructions causing installation may also include instructions causing activation of the color profiles so that they are actively being used by the computing device 102 with the monitors. By executing the instructions in the memory 104, the processor 106 obtains the first monitor identification 112 from the first monitor and obtains the second monitor identification 114 from the second monitor. The processor 106 then sends the first monitor identification 112 and the second monitor identification 114 to the color profile server. The processor 106 then receives the first color profile 116 and the second color profile 118 from the color profile server and causes the first color profile 116 and the second color profile 118 to be installed on the computing device 102.

Figure 2:
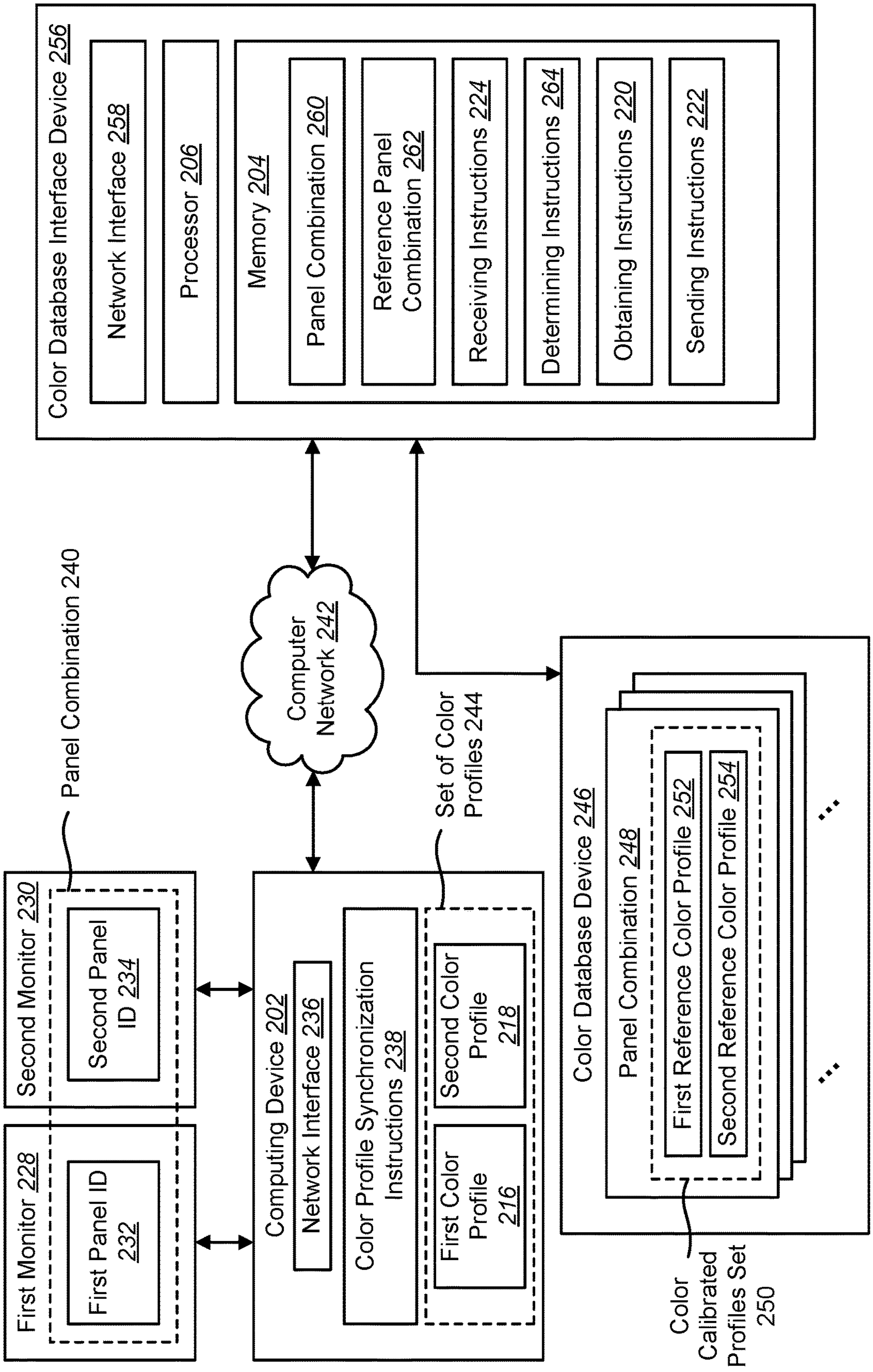
FIG. 2 is a block diagram illustrating an example of a computing device that may provide color profile updates.

FIG. 2 is a block diagram of an example of a computing device 202 or apparatus that may provide color profile updates. FIG. 2 is an example of a computing device 202 with two monitors being connected to a computer network 242. The computing device 202 may send a combination 240 of panel identifications to the color database interface device 256 using the computer network 242. The color database interface device 256 is a computing device in electronic communication with the color database device 246 to retrieve profiles from the color database device 246 and to provide the profiles to remote computing devices. The color database interface device 256 may receive this combination 240 and use the combination to access a color database device 246 to identify a matching reference combination. The matching or corresponding reference combination in the color database device 246 includes a reference set of color profiles 250. The reference color profiles have been determined to cause a substantial color match when used on a computing device with the same panel combination 248. This set of reference color profiles 250 is provided to the color database interface device 256 that then sends the color profiles to the computing device 202 via the computer network 242. Installation instructions on the computing device 202, when executed, install, apply or otherwise activate the new color profiles for use with the computer monitors 228, 230. The installation instructions, when executed by a processor, may further cause the processing pipeline of the monitors to use resources derived from the color profiles. With the new color profiles being used, the computing device 202 may have a more consistent color between the two monitors (the first monitor 228 and the second monitor 230).

The computing device 202 may be an example of the computing device 102 described in FIG. 1. The computing device 202 is in electronic communication with a first monitor 228 and a second monitor 230. A monitor or display device is a device that includes a display (e.g., display panel). The monitor may include a display panel, a processor, a communication interface, and/or a memory. A monitor may store a panel identification in the display memory or host memory. The panel identification may be alphanumeric information stored in a data structure that identifies the specific panel or display panel. The first monitor 228 may have a first panel identification (ID) 232 readable by the computing device 202, and the second monitor 230 may have a second panel identification 234 readable by the computing device 202. The display panel is circuitry to display optical information. Examples of the display panel may include organic light-emitting diode (OLED) display panels, light-emitting diode (LED) liquid crystal display (LCD) panels, microLED panels, miniLED panels, etc. The display panel may display a video signal or video signals (e.g., the video signal from the source device). The processor in a monitor is circuitry to control the monitor. In some examples, the processor in a monitor may be a scaler, application-specific integrated circuit (ASIC), and/or other circuitry.

The computing device 202 includes a first color profile 216 that is being used with the first monitor 228 and a second color profile 218 that is being used with the second monitor 230. In some examples, these color profiles may be ICC profiles. The combination of the first color profile 216 and the second color profile 218 may be referred to as a set of color profiles 244. Color profile synchronization instructions 238 cause, when executed by a processor, the synchronization of the color profiles on a computing device with color profiles from the color database device 246. In some examples, the color profile synchronization instructions 238 may be executed automatically without user interaction. In some examples, the color profile synchronization instructions 238 may be executed when a new monitor is detected, when an electrical connection is made with a monitor, in response to a calibration request, on a periodic basis, or a combination thereof. In further examples, when an unrecognized monitor is detected, the color profile synchronization instructions 238 may use a default identification for a generic monitor profile. In another example, the color database 246 may push updates of the color profiles down to the computing device 202 whenever updates are made to the color database device 246. The color profile synchronization instructions 238 cause, when executed by a processor, the computing device 202 to obtain or access the first panel identification 232 and the second panel identification 234 and may send this identification combination 240 to the color database interface device 256 via a computer network 242.

In some examples, the computing device 202 may include a network interface 236 through which the processor 206 may communicate with an external device or devices (e.g., remote device(s)). For example, the network interface 236 may be a network interface device to establish wireless or wired communication on a network. In some examples, the computing device 202 may be in communication with (e.g., have a communication link with) a remote computing device via a network. Examples of remote computing devices may include computing devices, server computers, desktop computers, laptop computers, smartphones, tablet devices, game consoles, etc. Examples of the network may include a local area network (LAN), wide area network (WAN), the Internet, cellular network, Long Term Evolution (LTE) network, 5G network, and/or combinations thereof, etc.

The color database interface device 256 is a computing device. The color database interface device 256 includes a processor 206 and memory 204. The processor 206 may be an example of the processor 106 described in FIG. 1. The memory 204 may be an example of the memory 104 described in FIG. 1. The color database interface device 256 also includes a network interface 258 for electronic communications through the computer network 242. In some examples, the color database interface device 256 is a server, such as a web server or data server.

The color database interface device memory 204 may store the received panel combination 260 from the computing device 202. The panel combination may be data including the first panel identification 232 and the second panel identification 234. The color database interface device 256 uses this panel combination 260 to look up and find a matching or corresponding combination in the color database device 246. The color database device 246 is a computing device that includes a database storing information about different combinations of computer panels and color matching profiles. The color database may be any type of data storage structure. In some examples, the color database 246 may have an exact match for the panel combination 260. In other examples, there may not be an exact match but a closely matching combination. The panel combination 248 that is found or matched in the color database is the corresponding monitor combination. In operation, the color database interface device 256 receives a panel combination 260 from a remote computing device 202 and uses that panel combination 260 to look up a reference panel combination 262 in the color database device 246, which may be an exact match or it may be a close match. A close match may be a match that is not exact, but has been determined to include a substitute for a monitor that behaves similarly to the specific monitor identified.

The memory 204 may store receiving instructions 224 that cause, when executed by a processor 206, and the color database interface device 256 to receive the panel combination 260 via the network interface 258. The determining instructions 264 cause, when executed by a processor 206, the determination of a corresponding reference panel combination 262 from the panel combination 260 received. The corresponding panel combination 262 is determined by accessing the color database 246. Obtaining instructions 220 cause, when executed by a processor 206, the obtaining of color profiles from the color database based on the panel combination 260. The color database interface device 256 accesses the color database device 246. Sending instructions 222 cause, when executed by a processor 206, the color database interface device 256 to send the obtained color profiles to the remote computing device 202 via the computer network 242.

The color database device 246 is a computing device that includes a database storing information about different combinations of computer panels and color matching profiles. The color database includes multiple panel combination 248 records where each record includes calibrated color profiles 250. Panel combination 260 of the color database interface device 256 is the panel combination 260 received from the remote computing device 202, and the panel combination 248 records are the panel combination 248 records that reside in the color database device 246. The database may be indexed by the panel identifications and combinations so that the database may be accessed or searched using the panel identifications and combinations. When the matching panel combination 248 is found, the record may include reference color profiles for that monitor combination. The reference color profiles in the color database may have been color calibrated and color matched for those specific panels to provide a substantial color match between the panels in the panel combination 248. The reference color profiles in the database may have been selected manually or they may be selected automatically by a computing device based on known color information about each panel used. The color database may continue to grow over time as more panel combinations 248 are added with reference color profiles for each combination of panels added to the database (e.g., for each combination of panels of monitor combinations recognized by the system). In some examples, the color database includes many different panel combinations 248. As shown in FIG. 2, a panel combination 248 in the color database device 246 includes a first reference color profile 252 and a second reference color profile 254 that are calibrated or matched color profiles. The combination of the first reference color profile 252 and the second reference color profile 254 may be referred to as a color calibrated profiles set 250.

In some examples, the color calibrated profiles set 250 may be received by the computing device 202 based on a calibration operation between a first target profile and a second target color profile on the computing device. If color profiles are used to define the space of operation of the color, then target color profiles may be the overall color space to be achieved when combining monitors. The calibration of such target color profiles on the computing device 202 may initiate the synchronization of color profiles on the computing device 202 with color calibrated profiles from the color database device 246.

Figure 3:
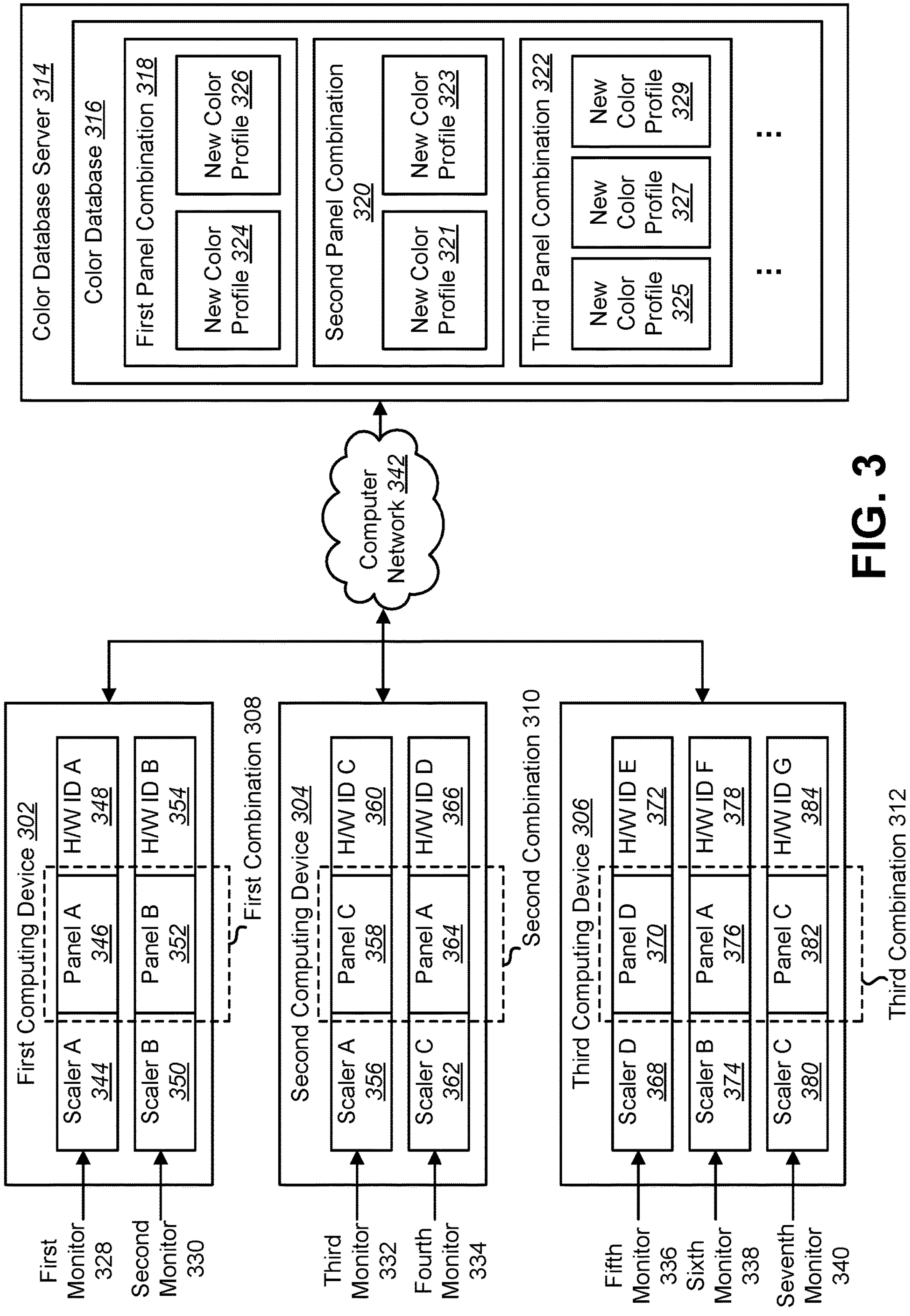
FIG. 3 is a block diagram illustrating an example of computing devices that may provide color profile updates.

FIG. 3 is a block diagram of an example of computing devices that may provide color profile updates. A first computing device 302, a second computing device 304, and a third computing device 306 obtain updated color profiles from the color database server 314 via the computer network 342. The computing devices are examples of the computing device 102 described in FIG. 1.

Monitors have an identification that may be provided to a computing device that is connected to the monitor. The identification provided by a monitor may include a number of different pieces of information including scaler model identifier, application-specific integrated circuit (ASIC) identification, panel identification, firmware identification, and the hardware manufacturer identification. The first computing device 302 obtains the identification information from the first monitor 328, which includes a scaler, application-specific integrated circuit (ASIC) identification (Scaler A 344), a display panel identification or identifier (Panel A 346), and a hardware (H/W) manufacturer identification (ID) (H/W ID A 348). The first computing device 302 also obtains the identification information from the second monitor 330, which is Scaler B 350, Panel B 352, and H/W ID B 354. The first computing device 302 uses the panel identifications for each of the monitors as the first combination 308. The first combination 308 includes the first panel identification and the second panel identification, which are the Panel A 346 and Panel B 352 identifiers in FIG. 3. The first combination 308 is used and sent to the color database server 314 in order to find a corresponding panel combination in a color database 316. The color database server 314 may find a match for the first panel combination 318 of panel A 346 and panel B 352 and returns the two new color profiles (324, 326) to the first computing device 302. The first computing device 302 may then cause the new color profiles (324, 326) to be installed and activated so that they will be used with the first monitor 328 and the second monitor 330. In some examples the first computing device 302 may automatically send the panel combination to the color database server 314, receive the new color profiles (324, 326), and then activate them on the computing device 302 without any user action.

The second computing device 304 is in communication with a third monitor 332 and a fourth monitor 334. The third monitor 332 identification information includes Scaler A 356, Panel C 358, and H/W ID C 360. The fourth monitor 334 identification information includes Scaler C 362, Panel A 364, and H/W ID D 366. The third monitor 332 has a panel identification as panel C 358 and the fourth monitor 334 has a panel identification as panel A 364. The second computing device 304 uses panel C 358 and panel A 364 as the second combination 310 of panels. This second combination 310 of panels is sent to the color database server 314 that uses the second combination 310 to search the color database 316 for a matching second panel combination 320. The second panel combination 320 is found in the color database 316, and the new color profiles (321, 323) from the color database 316 are provided to the second computing device 304 from the database server via the computer network 342. The second computing device 304 receives these new color profiles (321, 323) and installs them on the second computing device 304.

The third computing device 306 is connected to three monitors, a fifth monitor 336, a sixth monitor 338, and a seventh monitor 340. The fifth monitor 336 identification information includes Scaler D 368, Panel D 370, and H/W ID E 372. The sixth monitor 338 identification information includes Scaler B 374, Panel A 376, and H/W ID F 378. The seventh monitor 340 identification information includes Scaler C 380, Panel C 382, and H/W ID G 384. As shown, the fifth monitor 336 has a panel identification as panel D 370, the sixth monitor 338 has a panel identification as panel A 376, and the seventh monitor 340 has a panel identification as panel C 382. The third computer may use panel D 370, panel A 376, panel C 382 as the third combination 312 of panels that is sent to the color database server 314 and used to locate the matching panel combination 322 in the color database 316. The new color profiles (325, 327, 329) are obtained from the color database 316 and sent back to the third computing device 306 from the color database server 314. The third computer then installs these new color profiles (325, 327, 329) and activates them so that they are being used with the fifth monitor 336, the sixth monitor 338, and the seventh monitor 340. In some examples, the color database 316 may include additional panel combinations having calibrated color profiles that are not shown in FIG. 3.

Figure 4:
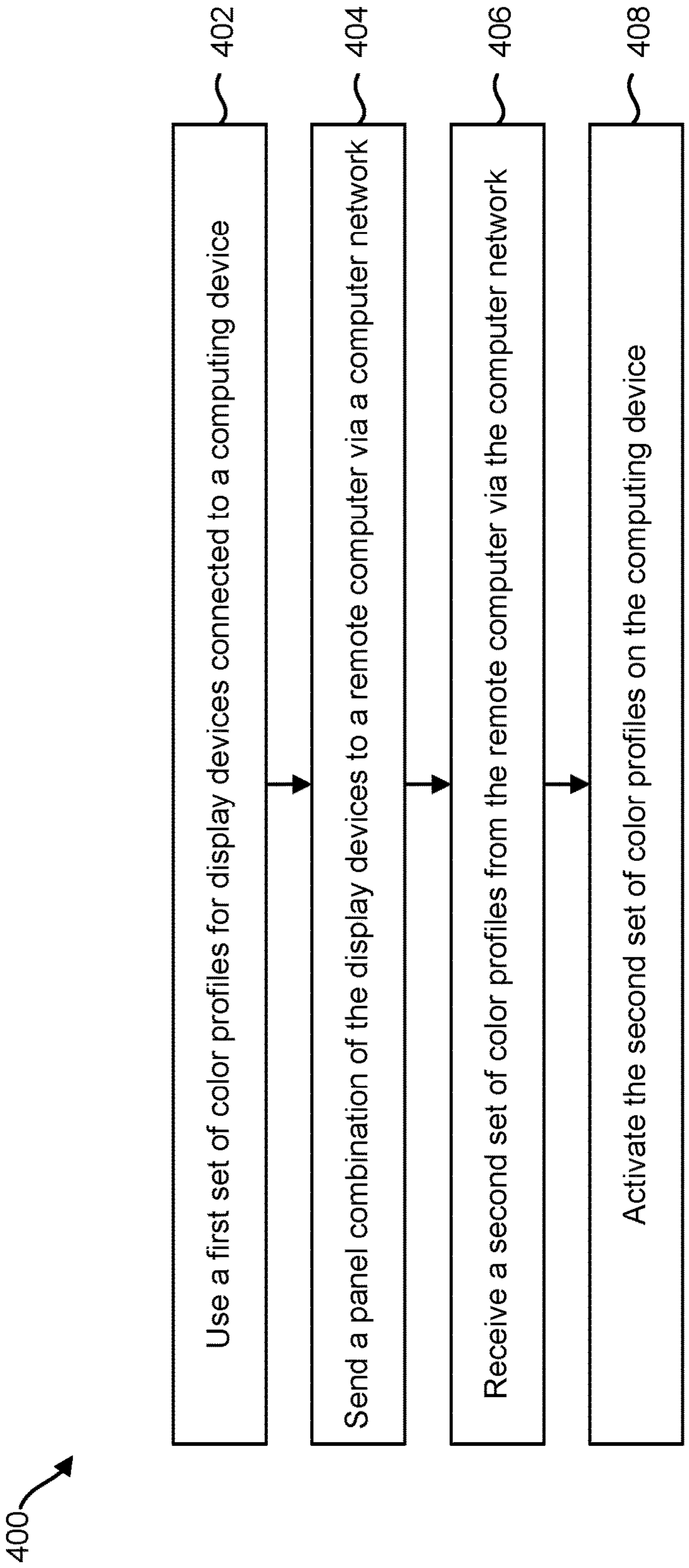
FIG. 4 is a flow diagram illustrating an example of a method for providing color profile updates for a computing device.

FIG. 4 is a flow diagram illustrating an example of a method 400 for providing color profile updates for a computing device. The method 400 and/or a method 400 element (s) may be performed by a computing device. At 402, a first set of color profiles is used for display devices connected to a computing device. At 404, the techniques described herein may send a panel combination of the display devices to a remote computer (e.g., the color database server) via a computer network. At 406, a second set of color profiles is received from the remote computer via the computer network. At 408, the second set of color profiles are activated on the computing device.

Figure 5:
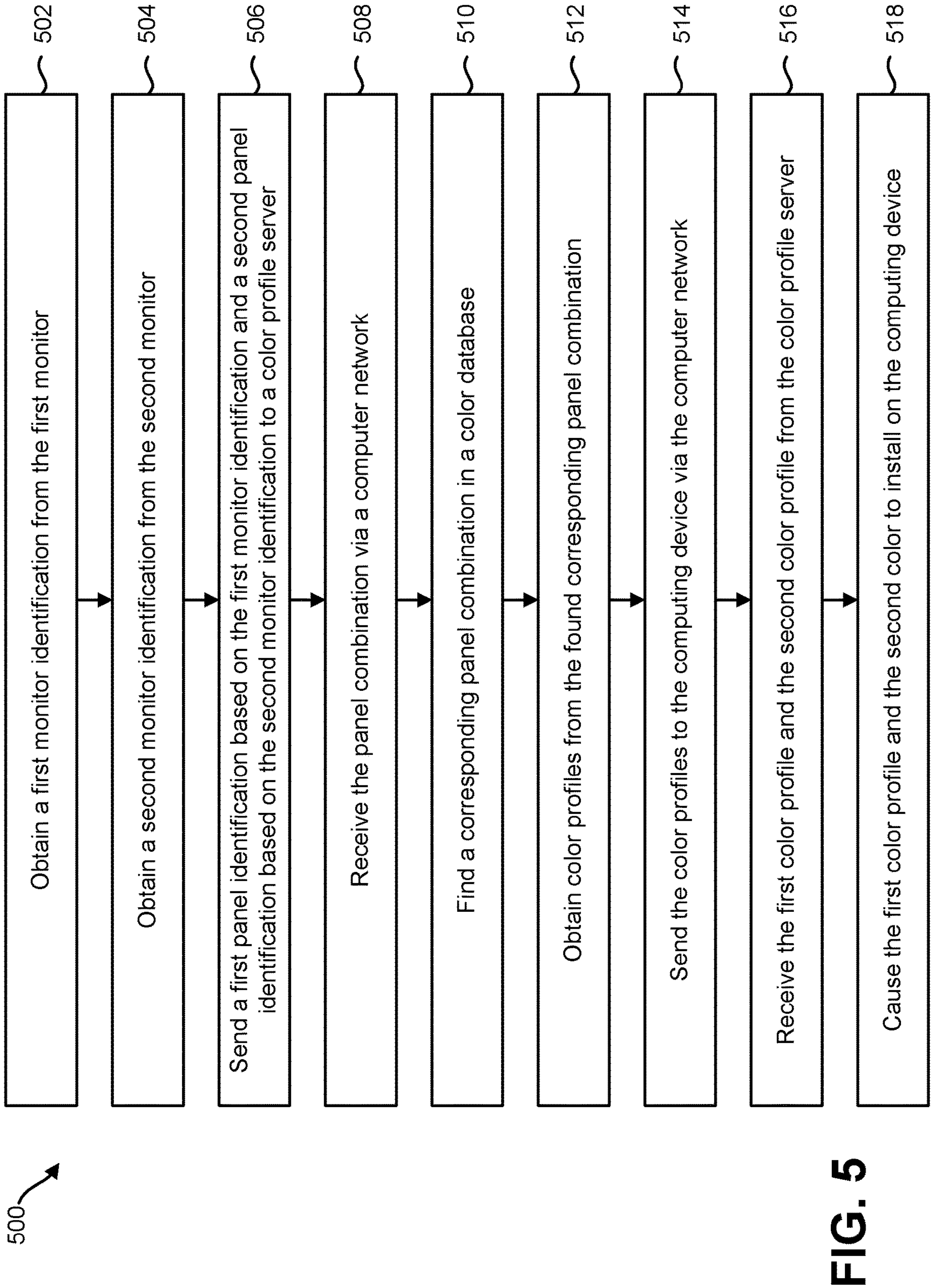
FIG. 5 is a flow diagram illustrating an example of a method for providing color profile updates for a computing device.

FIG. 5 is a flow diagram illustrating an example of a method 500 for providing color profile updates for a computing device. The method 500 and/or a method 500 element (s) may be performed by a computing device.

At 502, the computing device obtains a first monitor identification from the first monitor. At 504, the computing device obtains a second monitor identification from the second monitor. At 506, the computing device sends a first panel identification based on the first monitor identification and a second panel identification based on the second monitor identification to a color profile server. Examples of a color profile server are a color database interface device 256 and a color database device 246.

At 508, the color profile server receives the panel combination via a computer network. At 510, the server finds a corresponding panel combination in a color database. At 512, the server obtains color profiles from the found corresponding panel combination. At 514, the server sends the color profiles to the computing device via the computer network.

At 516, the computing device receives the first color profile and the second color profile from the color profile server. At 518, the computing device causes the first color profile and the second color to install on the computing device. Installing profiles on the computing device may include causing the processing pipeline of the monitor to use resources derived from the color profiles.

Figure 6:
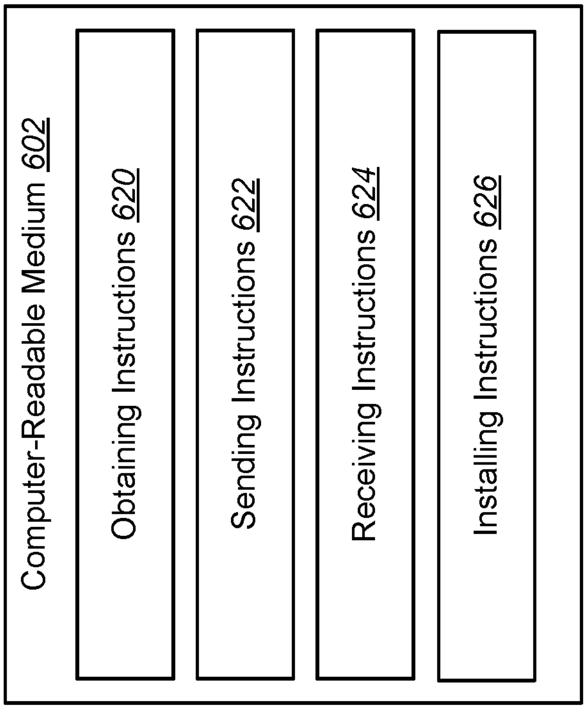
FIG. 6 is a block diagram illustrating an example of a computer-readable medium for providing color profile updates for a computing device.

FIG. 6 is a block diagram illustrating an example of a computer-readable medium 602 for providing color profile updates for a computing device. The computer-readable medium 602 may be a non-transitory, tangible computer-readable medium. The computer-readable medium 602 may be, for example, RAM, EEPROM, a storage device, an optical disc, and/or the like. In some examples, the computer-readable medium 602 may be volatile and/or non-volatile memory, such as DRAM, EEPROM, MRAM, PCRAM, memristor, flash memory, and/or the like. In some examples, the computer-readable medium 602 may be included in a computing device, an electronic device and/or may be accessible to a processor of a computing device or electronic device. In some examples, the computer-readable medium 602 may be an example of the memory 104 described in relation to FIG. 1.

The computer-readable medium 602 may include data, executable instructions, and/or executable code. For example, the computer-readable medium 602 may include obtaining instructions 620, sending instructions 622, receiving instructions 624 and installing instructions 626.

The obtaining instructions 620 may be instructions that, when executed by a processor, cause the processor to obtain panel identifications from connected monitors. For example, obtaining instructions 620 cause, when executed by a processor, the processor to obtain a first panel identification from a first monitor and a second panel identification from a second monitor. The sending instructions 622 cause, when executed by a processor, the processor to send the first panel identification and the second panel identification to a remote color profile server. The receiving instructions 624 cause, when executed by a processor, the receiving of a new first color profile and a new second color profile from the color profile server. The installing instructions 626 cause, when executed by a processor, the processor to install or otherwise activate the new received color profiles on the computing device so that they will be used with the first monitor and the second monitor.

A technique or techniques, a method or methods (e.g., method(s) 400 and/or 500) and/or an operation or operations described herein may be performed by (and/or on) an electronic device and/or a computing device. In some examples, an electronic device and/or a computing device may include circuitry (e.g., a processor with instructions and/or connection interface circuitry) to perform a technique or techniques described herein.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, aspects or elements of the examples described herein may be omitted or combined.

The invention claimed is:

1. A computing device, comprising:
a first video interface for a first monitor;
a second video interface for a second monitor; and
a processor to:
obtain a first monitor identification from the first monitor;
obtain a second monitor identification from the second monitor;
send the first monitor identification and the second monitor identification together as a panel combination to a color profile server;
receive a first color profile and a second color profile from the color profile server as a reference profile set associated with the panel combination, wherein the first color profile and the second color profile are calibrated for the panel combination; and
cause the first color profile and the second color profile to install on the computing device.

2. The computing device of claim 1, wherein the first color profile and the second color profile are international color consortium (ICC) profiles.

3. The computing device of claim 1, wherein the first monitor identification comprises a first display panel identification and the second monitor identification comprises a second display panel identification.

4. The computing device of claim 1, wherein the first color profile and the second color profile are included in the reference profile set based on a prior calibration operation between a first target profile and a second target color profile.

5. The computing device of claim 1, wherein the processor is to automatically synchronize color profiles with the color profile server.

6. The computing device of claim 1, wherein the processor is to detect a third monitor, and then to automatically:
obtain a third monitor identification from the third monitor;
send the first monitor identification, the second monitor identification, and the third monitor identification to the color profile server;
receive a third color profile, a fourth color profile, and a fifth color profile from the color profile server based on a combination of panels identifiable using the first monitor identification, the second monitor identification and the third monitor identification; and
cause the third color profile, the fourth color profile, and the fifth color profile to install on the computing device.

7. The computing device of claim 1, wherein causing the first color profile and the second color profile to install on the computing device comprises causing processing pipelines of the first monitor and the second monitor to use resources derived from the first color profile and the second color profile.

8. The computing device of claim 1, wherein the processor is to automatically synchronize color profiles when a new monitor is detected.

9. The computing device of claim 1, wherein the first color profile and the second color profile are color matched to provide a substantial color match between the first monitor and the second monitor using the reference profile set.

10. The computing device of claim 1, wherein the reference profile set is calibrated and color matched for the panel combination to reduce color discrepancy between the first monitor and the second monitor.

11. The computing device of claim 1, wherein the reference profile set is configured to provide consistent color between all monitors in the panel combination.

12. An apparatus, comprising:
a network interface; and
a processor to:

receive a monitor combination via the network interface;

obtain color profiles based on the monitor combination, wherein the color profiles are obtained as a reference profile set associated with a monitor-combination record calibrated for the monitor combination; and send the color profiles to a remote computing device using the network interface.

13. The apparatus of claim 12, wherein the monitor combination comprises a first display panel identification and a second display panel identification.

14. The apparatus of claim 12, wherein obtaining color profiles based on the monitor combination comprises accessing a color database of multiple panel combination records, and wherein each record includes calibrated color profiles.

15. The apparatus of claim 12, wherein the reference profile set is color matched for the monitor combination to provide a substantial color match between panels identified by the monitor combination.

16. A method, comprising:

using a first set of color profiles for display devices connected to a computing device;

sending a panel combination of the display devices to a remote computer via a computer network;

receiving a second set of color profiles from the remote computer via the computer network, wherein the second set of color profiles is a reference profile set calibrated for and selected based on the panel combination; and activating the second set of color profiles on the computing device.

17. The method of claim 16, wherein the panel combination comprises two panel identifiers.

18. The method of claim 16, wherein the panel combination comprises three panel identifiers.

19. The method of claim 16, further comprising automatically synchronizing a third set of color profiles.

20. The method of claim 16, wherein the reference profile set is calibrated and color matched for the panel combination to provide a substantial color match between the display devices.

* * * * *